United States Patent
Pratt et al.

(10) Patent No.: US 9,620,006 B2
(45) Date of Patent: Apr. 11, 2017

(54) SYSTEMS, METHODS, AND COMPUTER READABLE STORAGE DEVICES FOR CONTROLLING AN APPEARANCE OF A SURFACE USING SOUND WAVES

(71) Applicant: AT&T Intellectual Property I, L.P., Atlanta, GA (US)

(72) Inventors: James H. Pratt, Round Rock, TX (US); Ari Craine, Marietta, GA (US); Garrett Stettler, Austin, TX (US); Marc Andrew Sullivan, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 20 days.

(21) Appl. No.: 14/550,266

(22) Filed: Nov. 21, 2014

(65) Prior Publication Data

US 2016/0148502 A1  May 26, 2016

(51) Int. Cl.
  *G08C 23/02* (2006.01)
(52) U.S. Cl.
  CPC .................................... *G08C 23/02* (2013.01)
(58) Field of Classification Search
  CPC .......................... G08C 23/02; B01L 3/502761
  See application file for complete search history.

(56) References Cited

U.S. PATENT DOCUMENTS

| | | | |
|---|---|---|---|
| 4,463,606 A | 8/1984 | Barmatz | |
| 4,777,823 A * | 10/1988 | Barmatz | G10K 15/00 181/0.5 |
| 4,991,923 A | 2/1991 | Kino et al. | |
| 5,225,089 A | 7/1993 | Benes et al. | |
| 5,810,155 A | 9/1998 | Hashimoto et al. | |
| 5,902,489 A | 5/1999 | Yasuda et al. | |
| 6,609,609 B2 | 8/2003 | Takasan et al. | |
| 6,644,118 B2 | 11/2003 | Kaduchak et al. | |
| 6,647,791 B1 | 11/2003 | Hoppner et al. | |
| 6,802,220 B2 | 10/2004 | Takasan et al. | |
| 6,881,314 B1 | 4/2005 | Wang et al. | |
| 6,929,750 B2 | 8/2005 | Laurell et al. | |

(Continued)

FOREIGN PATENT DOCUMENTS

| | | |
|---|---|---|
| EP | 20070730650 | 1/2009 |
| WO | 2009085287 | 7/2009 |

OTHER PUBLICATIONS

Levitate Objects in 3D space, by Sarah Griffiths Jan. 2, 2014.*

(Continued)

*Primary Examiner* — Nabil Syed
(74) *Attorney, Agent, or Firm* — Greenblum & Bernstein, P.L.C.

(57) ABSTRACT

The emission of variable ultrasonic sound waves from a plurality of sound sources is controlled based on controlled signals generated by a controller. The plurality of sound sources emit ultrasonic waves towards a surface based on the control signals, creating a force which causes particles within a region proximate the surface to move in a desired manner with respect to the surface. The movement of the particles with respect to the surface changes the appearance of the surface. In this manner, the appearance of the surface may be changed in a desired manner to suit needs for home automation and security.

19 Claims, 5 Drawing Sheets

(56) References Cited

U.S. PATENT DOCUMENTS

| | | | |
|---|---|---|---|
| 7,015,047 | B2 | 3/2006 | Huang et al. |
| 7,081,192 | B1 | 7/2006 | Wang et al. |
| 7,140,827 | B2 | 11/2006 | Ikehata et al. |
| 7,837,040 | B2 | 11/2010 | Ward et al. |
| 7,870,946 | B2 | 1/2011 | Zimmermann et al. |
| 7,944,115 | B2 | 5/2011 | Xu et al. |
| 8,106,330 | B2 | 1/2012 | Arao et al. |
| 8,266,951 | B2 | 9/2012 | Kaduchak et al. |
| 8,303,778 | B2 | 11/2012 | Rathgeber et al. |
| 8,794,877 | B2 | 8/2014 | Schilp et al. |
| 2004/0257906 | A1 | 12/2004 | Scriba et al. |
| 2010/0206696 | A1 | 8/2010 | Kondoh |
| 2011/0239768 | A1* | 10/2011 | Berke ................... G01N 29/07 73/627 |
| 2013/0047728 | A1* | 2/2013 | Cochran ........... B01L 3/502761 73/570.5 |

OTHER PUBLICATIONS

"Ultrasound", Wikipedia, <http:en.wikipedia.org/wiki/Ultrasound>, accessed Nov. 12, 2014.
"Marine mammals and sonar", Wikipedia, <http://en.wikipedia.org/wiki/Marine_mammals_and_sonar>, accessed Nov. 12, 2014.
Foresti, "Acoustophoretic contactless transport and handling of matter in air", published 2013, PNAS, <http://www.pnas.org/content/110/31/12549.abstract>.
"Sound wave 3Dvolution: Japanese scientists move objects using acoustic levitation", published 2014, <http://rt.com/news/3d-japan-objects-levitation-102/>.
"Sound Waves Levitate, Move Particles", published 2013, i09, <http://news.discovery.com/tech/nanotechnology/sound-waves-levitate-move-particles-130716.htm>.
"Moving Particles with Sound Waves", published 2014, Buzz Blog, Physics Central, <http://www.physicscentral.com/buzz/blog/index.cfm/?postid=4102667549403288353>.
Sudayuki, "Phenomena, theory and applications of near-field acoustic levitation", 2002, <http://web.archive.org/web/20050116070615/http://www.ia.csic.es/Sea/revista/VOLXXXIII34/02.pdf>.
Wilson, "How Acoustic Levitation Works", 2007, <http://science.howstuffworks.com/acoustic-levitation.htm>.
Li et al, "Phononic-Crystal-Based Acoustic Sieve for Tunable Manipulations of Particles by a Highly Localized Radiation Force", 2014, <http://journals.aps.org/prapplied/abstract/10.1103/PhysRevApplied.1.051001>.
Choi, "Scientists Levitate Small Animals", 2006, Live Science, <http://www.livescience.com/1165-scientists-levitate-small-animals.html>.
Monks, "Can levitating appliances take off?," CNN, Aug. 29, 2014, <http://www.cnn.com/2014108129/tech/innovation/can-levitating-appliances-take-off/>.
"Scientists Use Sound Waves to Levitate, Manipulate Matter," thecollectiveint.com, 2013, <http://www.thecollectiveint.com/2013111/scientists-use-sound-waves-to-levitate.html>.
Fuhrmann A., J. S. Marshall, and J. Wu, "Effect of acoustic levitation force on aerodynamic particle removal from a surface," Applied Acoustics 74.4 (2013): 535-543, <http://www.sciencedirect.com/science/article/pii/S0003682X12003064>.

* cited by examiner

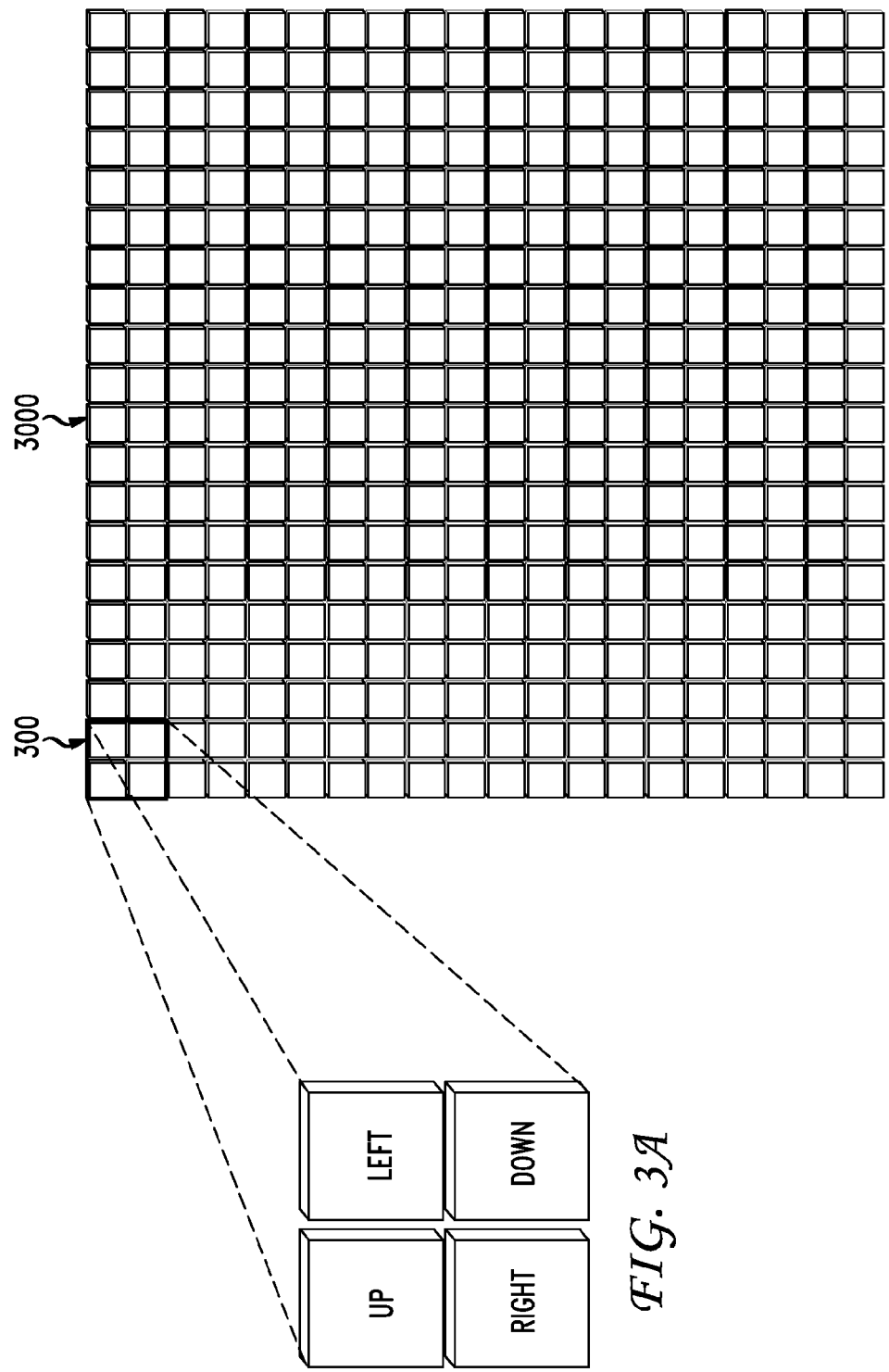

SYSTEMS, METHODS, AND COMPUTER READABLE STORAGE DEVICES FOR CONTROLLING AN APPEARANCE OF A SURFACE USING SOUND WAVES

TECHNICAL FIELD

The present disclosure relates generally to the movement of particles using sound waves. More particularly, the present disclosure relates to controlling the movement of particles with respect to a surface using sound waves.

BACKGROUND

There are demands for controlling the appearance of surfaces, such as glass windows. Such demands arise from needs for privacy, e.g., in urban environments. Such demands also arise from needs for personalization, e.g., in home and business environments. These demands have traditionally been met using manual approaches.

For example, to control the amount of indirect light through a glass window, window coverings have been used. While window coverings, such as blinds and curtains, may be used to alter the light allowed through a window temporarily, the use of such coverings requires manual manipulation, which may be cumbersome. Other attempts have involved manually tinting the glass. However, glass tinting is permanent and does not readily allow for change.

There have been other attempts to change the appearance of a window or a glass surface using electronic circuits within the surface to change the electrical properties of the surface. However, such circuits are not easily sustainable and are prohibitively expensive. Also, this approach is not readily applicable to legacy systems, as it would require the installation of new windows or glass including the electronic circuits to change the electrical properties of the surface.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the present disclosure.

According to an illustrative embodiment, a system is provided for controlling the appearance of a surface using sound waves. The system includes a plurality of sound sources which receive control signals from a controller. The plurality of sources emit variable ultrasonic sound waves towards a surface based on the control signals. The variable ultrasonic sound waves create a force which causes particles within a region proximate the surface to move in a desired manner with respect to the surface. The particles within the region proximate the surface are caused to move with respect to the surface such that the surface has a desired appearance.

According to another embodiment, a method is provided for controlling an appearance of a surface using sound waves. The method includes receiving control signals by a plurality of sound sources and emitting variable ultrasonic sound waves from the plurality of sound sources towards a surface based on the control signals. The variable ultrasonic sound waves create a force which causes particles within a region proximate the surface to move in a desired manner with respect to the surface. The particles within the region proximate the surface are caused to move with respect to the surface such that the surface has a desired appearance.

According to another embodiment, a computer readable storage device has instructions stored thereon which, when executed by a processor, cause the processor to perform operations for controlling an appearance of a surface using sound waves. The operations include generating control signals responsive to input indicating a desired appearance of a surface and transmitting the control signals to a plurality of sound sources. The control signals cause the plurality of sound sources to emit variable ultrasonic sound waves towards a surface and create a force which causes visible particles within a region proximate the surface to move with respect to the surface, such that the surface has the desired appearance.

BRIEF DESCRIPTION OF THE DRAWINGS

FIGS. 3A, 3B and 3C illustrate examples of speaker arrays which may be used to emit sound waves, according to an illustrative embodiment;

DETAILED DESCRIPTION

Detailed illustrative embodiments are disclosed herein. It must be understood that the embodiments described and illustrated are merely examples that may be embodied in various and alternative forms, and combinations thereof. As used herein, the word "illustrative" is used expansively to refer to embodiments that serve as examples or illustrations. The figures are not necessarily to scale and some features may be exaggerated or minimized to show details of particular components. Specific structural and functional details disclosed herein are not to be interpreted as limiting.

As those skilled in the art will recognize, a sound source, such as an ultrasonic speaker, produces sounds waves. These sounds waves cause the sound source to vibrate which, in turn, pushes air molecules away from the sound source and increases the pressure in the localized region of the air in which the sound wave is directed. This increase in pressure, in turn, creates a force which causes particles within the localized region of air towards which the sound is directed to move. When an array of opposed sound sources produce ultrasonic sound waves, the sound waves intersect, creating standing waves which are capable of suspending particles in the air at sound pressure nodes.

According to an illustrative embodiment, by controlling the amplitude, phase, and frequency of the sound waves produced by an array of sound sources, the pressure and the resultant force created by the sound waves causes particles within a region towards which the sound is directed to move in a desired manner. In particular, the amplitude, phase, and frequency of sound waves directed toward a surface may be varied, such that particles within a region proximate the surface are caused to move in a manner with respect to the surface to cause the appearance of the surface to change in a desired manner. Particles within the region proximate the surface may be levitated, rotated with respect to each to create a static charge, and moved to create a "film" which may be placed on or near the surface, to affect the light reflected from the surface or passing through the surface. In this manner, the appearance of the surface may be changed in a desired manner to suit needs for privacy, lighting, aesthetics, and other purposes, as described in detail below.

Figure 1A:
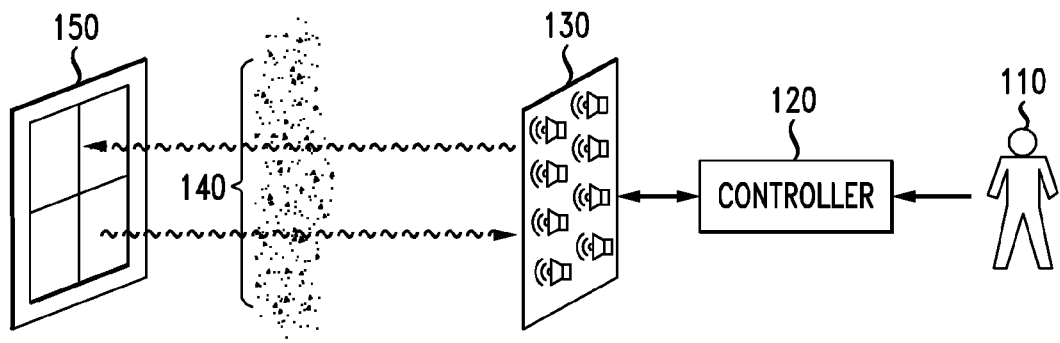
FIGS. 1A, 1B, and 1C illustrate an environment in which sound waves may be used to control the appearance of a surface according to an illustrative embodiment.
Figure 1B:
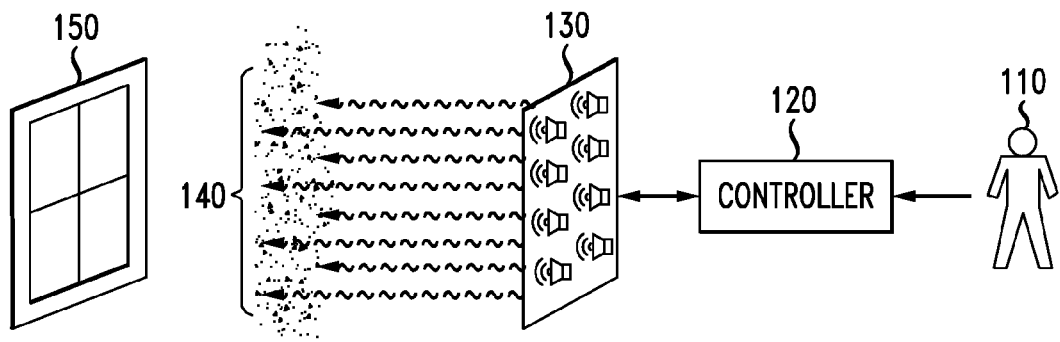
Figure 1C:
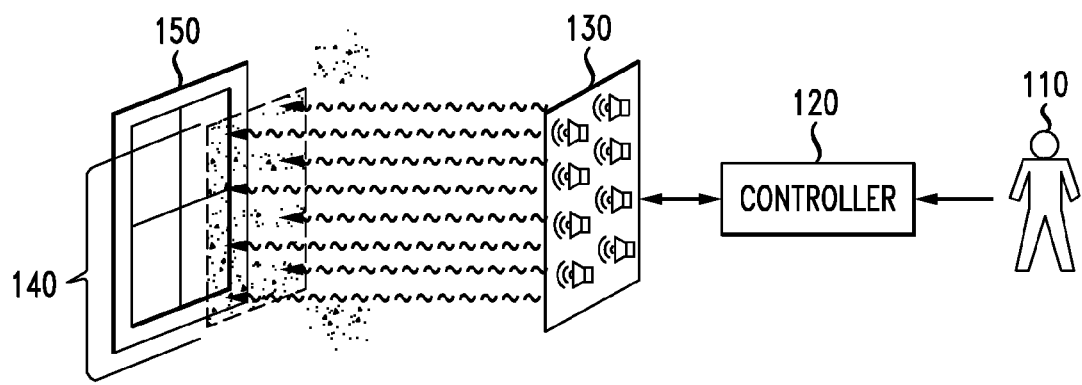

FIGS. 1A-1C illustrate an environment in which sound waves may be used to control the appearance of a surface according to an illustrative embodiment. As shown in FIGS. 1A-1C, a surface 150, such as a window, is surrounded by particles, such as dust floating within a region 140 proximate the window. The region 140 may be considered in "front" of the surface 150 from the perspective of a user 110. The surface 150 need not be a flat, planar surface but may include non-planar surfaces, e.g., a window with panes. A sound source, such as a speaker array 130, is positioned with respect to the surface 150, such that sound waves may be emitted by the speaker array 130 towards the surface 150 and the region of particles 140.

In the embodiment shown in FIGS. 1A-1C, the speaker array 130 is in "front" of the surface 150 from the perspective of a user 110. However, it should be appreciated that the speaker array 130 may be positioned in any place such that it is capable of emitting and receiving sound waves to and from the surface 110.

A controller 120 is connected via a wireless connection or a wired connection to the speaker array 130. The controller 120 may a discrete from the speaker array 130 or may be integrated wholly or partially within the speaker array 130. The controller 120 generates control signals to control the emission of sound waves by the speaker array 130. Control signals may be generated responsive to input from a user 110, received via a wired or wireless connection or via a user interface on the controller 120. The controller 120 may also have information, such as predetermined conditions, stored therein which may be considered "input" for generating control signals. This is described in further detail below.

The controller 120 also receives signals from the speaker array 130 which the controller 120 uses to generate control signals, as described in further detail below. Although the controller 120 is illustrated as being positioned in between the speaker array 130 and the user 110, it should be appreciated that the controller 120 may be anywhere as long as it is able to receive input from the user 110 and send and receive signals to and from the speaker array 130.

Referring now in particular to FIG. 1A, responsive to a request from the controller 120, the speaker array 130 emits a pinging sound or pulse towards the surface 150. The request may be generated by the controller 120 responsive to a request from the user 110 and/or based on predetermined conditions, e.g., a time of day in the home or business in which the surface 150 is contained, which the controller 120 may keep track of. The request may also be generated by the controller 120 responsive to a request from a source other than the user 110, e.g., a signal received from a security system responsive to a door being opened in a home or business within which the surface 150 is contained.

The pinging sound or pulse may of any suitable frequency such that it is useful for mapping the surface 150. For example, the frequency of the pinging sound or pulse may be an ultrasonic frequency, e.g., 100-200 Khz. Alternatively, the frequency of the pinging sound or pulse may be a lower frequency, e.g., 50 Hz. This may be useful if the air (or other material, e.g., water) through which the pinging sound or pulse passes to reach the surface 150 is dense.

The pinging sound or pulse reflected from the surface 150, and the reflected pulse is received by the speaker array 130. Based on the reflected pulse, properties of the surface 150, such as the dimensions, the location, the firmness, etc. may be determined. This determination may be made by logic and/or a processor executing computer readable instructions stored in a memory in the speaker array 130. Alternatively, this determination may be made by the controller 120 based on a signal from the speaker array 130 representing the reflected pulse.

Referring now to FIG. 1B, based on the properties of the surface 150, the controller 120 generates control signals to cause the speaker array 130 to emit sound waves which will, in turn, cause movement of the particles within the region 140 in a desired manner. The sound waves may be emitted at a variable ultrasonic frequency, e.g., around 20 KHz, which is not audible to the human ear to avoid risks to hearing. The control signals generated by the controller 120 may cause the frequency, amplitude and phase of the sound waves emitted by the speaker array 130 to vary depending upon the mass of particles within the region 140. The particle mass may be estimated by the controller 120 based on conditions within a room containing the surface 150 and the region 140 and/or the controller 120 may store default particle masses.

According to an illustrative embodiment, the controller 120 generates control signals to cause the speaker array 130 to emit ultrasonic sound waves that will cause the particles within the region 140 to move with respect to the surface 150 such that the surface has a desired appearance. For example, as shown in FIG. 1C, the controller 120 may generate control signals that will cause the speaker array 130 to emit ultrasonic sound waves that cause particles floating within the region 140 proximate the surface 150 to move towards the surface and create a "film" on the surface. This will change the appearance of the surface 150 from the perspective of the user 110. For example, if the surface 150 is a window, the movement of the particles onto the surface 150 will cause obstruction of light passing through the window, thus reducing the opacity of the window.

As another example, the controller 120 may generate control signals that will cause the speaker array to emit ultrasonic sound waves that cause the particles floating within the region 140 proximate the surface 150 to move away from the surface 150. In the case of the surface being a window, this will cause the window's opacity, from the perspective of the user 110, to increase.

As described in more detail below, the controller 120 may generate signals to check whether the appearance of the surface achieved after the movement of the particles in the region 140 is the desired appearance.

Figure 2:
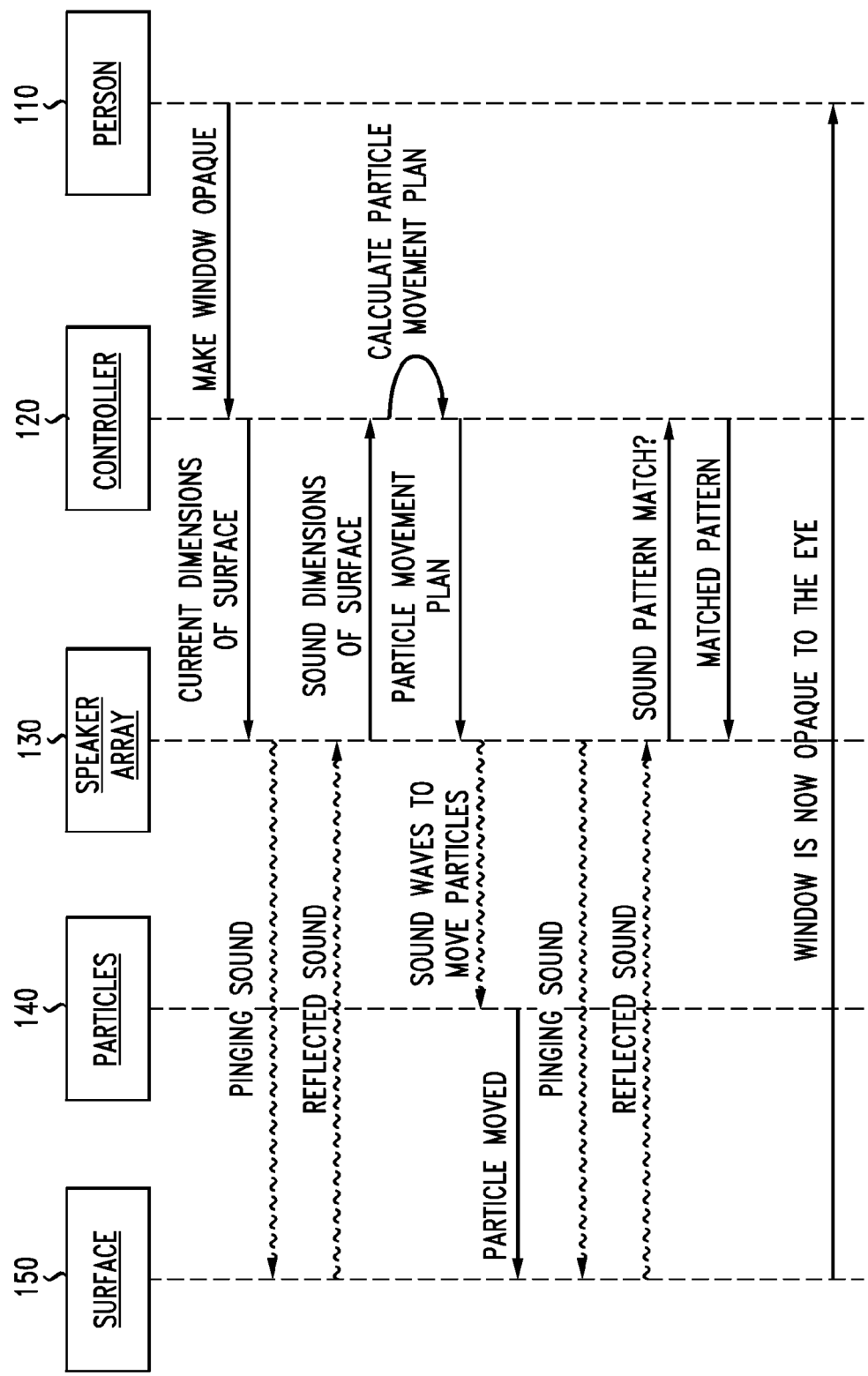
FIG. 2 illustrates a flow of control signals and sound waves for controlling the appearance of a surface according to an illustrative embodiment.

FIG. 2 illustrates a detailed example of a flow of control signals and sound waves to control the appearance of a surface according to an illustrative embodiment. For illustrative purposes, the example illustrated in FIG. 2 demonstrates how control signals and sound waves are used to control the opacity of a window from the perspective of a user such that the window appears opaque to the user. This may be desirable, e.g., when the user is waking up and wants the window to let light pass through. However, it should be appreciated that a similar flow may be used to control the appearance of a surface in another manner, e.g., to control the color of a surface. This is described in further detail below.

Referring to FIG. 2, responsive to a request from a user 110, the controller 120 sends a control signal to the speaker array 130 to determine the current dimensions of the surface 150. The request from the user 110 may be input in real time or may be input in advance by the user or another source. For example, the controller 120 may act responsive to the occurrence predetermined conditions, e.g., a particular time of day, etc., and these conditions may be input by the user 110 or received from another source.

The speaker array 130 emits a pinging sound or pulse towards the surface 150. The surface 150 may be stationary or moving. The pinging sound is reflected from the surface 150 back to the sound array 130. The speaker array 130 sends information representing the reflected sound pulse back to the controller 120, and the controller 120 determines properties of the surface, e.g., the dimensions and location of the surface, based on the reflected sound pulse. As an alternative, the speaker array 130 may include logic to determine the properties of the surface 150 based on the reflected sound.

Based on the properties of the surface 150, the controller 120 calculates a particle movement plan that will cause particles to move with respect to the surface 150 such that the surface has an opaque appearance. This calculation may be performed based, e.g., on pre-stored particle movement plans. The controller 120 can select from these plans and adjust them based on the properties of the surface 150. The controller 120 sends control signals to the speaker array 130 based on the calculated particle movement plan. The control signals cause speakers within the speaker array 130 to emit ultrasound waves at amplitudes, phases, and frequencies that cause particles within the region 140 to move away from the front of the surface to cause the surface to appear opaque to the user 110. The particle movement plan that results in this particle movement may be one among several particle movement plans stored, e.g., in a database within the controller 120.

As a check to ensure that the particles have moved in the desired manner, the speaker array 130 emits another pinging sound pulse towards the surface 150, and the reflected sound pulse is received by the speaker array 130. A determination is made whether a sound pattern of the reflected sound pulse matches a predetermined sound pattern that corresponds to an opaque appearance. This sound pattern may be associated with the particle movement plan. That is, each particle movement plan for achieving a desired surface appearance may be associated with a reflected sound pattern that, when matched, indicates that the surface has the desired appearance. This determination may be made by the controller 120, responsive to information from the speaker array 130 indicative of the reflected sound. Alternatively, this determination may be made by logic within the speaker array 130. If the reflected sound pattern matches the predetermined sound pattern, the window may be considered to appear opaque to the user 110.

Although the example illustrated in FIG. 2 is directed towards controlling the opaque appearance of a window, it should be appreciated that a similar control signal flow and sound wave flow may be used for controlling the appearance of other surfaces. For example, responsive to a user request for a surface to have an appearance to suit a particular mood, ink droplets may be injected into the air within the region proximate the surface and may be caused to move with respect to each other and towards the surface to create a film over the surface which will change the color of the surface. In addition or instead of being responsive to a user request, such a change in surface appearance may be caused in response to other input or predetermined conditions, e.g., responsive to a particular time of day, responsive to tuning of a radio that is in communication with the controller 120 to particular radio station, etc.

In addition, the appearance of a surface may be controlled based on security concerns. For example, responsive to an input from a user or an external source, such as an alarm that is in communication with the controller 120, the controller may cause particles within a region proximate a window to move with respect to the surface such that the window is less opaque to users "behind" the window (e.g., outside a residence or business in which the window is contained).

As another example, the techniques and systems described herein may be used in a retail environment, to cause the appearance of a surface to change to move customers to or away from a particular area. A clothing rack that is responsive to customer activity may communicate low activity to the controller 120 or a network controller that is communication with the controller. Also, a networked database having information concerning the merchandise on the clothing rack may communicate low sales to the controller 120. The locations of customers within the store may be tracked using, e.g., location tracking services on cell phones carried by the customers. A network controller may match the preferences of users with those of merchandise on the rack, determining customers who may be interested in clothes on the rack. The network controller may also determine that a portion of the store is overcrowded. The network controller may communicate with the controller 120 to cause the speaker array 130 to emit ultrasonic sound waves that cause movement of particles to change the appearance of a surface near the rack. The appearance of the surface near the rack may be changed so that the surface appeals to the customers, drawing them to the rack, or so that it does not appeal to the customers, steering them away from the rack.

Figure 3C:
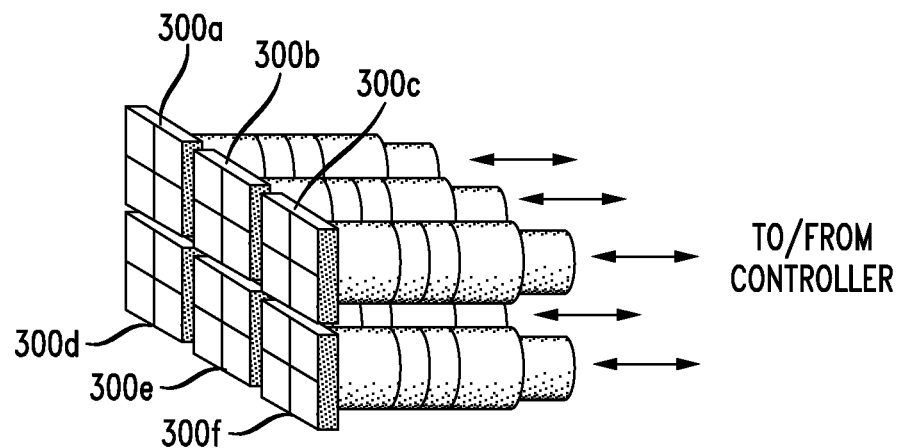

FIGS. 3A-3C illustrate examples of speaker panels and arrays which may be used to emit sound waves according to illustrative embodiments. FIG. 3A illustrates a single speaker array, also referred to herein as a panel, dedicated to moving a particle (or particles) within a small, localized area that is a function of the size of the single speaker array and a distance to the particle(s). As an illustrative example, a small localized area may be 1 cm$^3$. The speaker array shown in FIG. 3A, referred to herein as a speaker panel, may be included as a panel 300 in a larger speaker array 3000, shown in FIG. 3B.

As indicated in FIG. 3A, the speaker panel 300 includes four portions. Each portion is dedicated to moving a particle (and/or particles) within a small localized area towards which sound waves from the speaker array 300 are directed in a particular manner. For example, referring to FIG. 3A, one portion is dedicated to moving particle(s) up, e.g., by directing sound waves in a direction below the particle(s), creating a force that moves the particle(s) up. Similarly, another portion is dedicated to moving particle(s) down, e.g., by directing sound waves in a direction above the particle, creating a force that causes the particle(s) to move down. Yet another portion is dedicated to moving a particle(s) to the left by directing sound waves to the right of the particle(s), and another portion is dedicated to moving a particle(s) to the right, by directing sound waves to the left of the particle.

By controlling the amplitude, phase, and frequency of ultrasonic sound waves emitted by each portion of the speaker panel 300, the movement of a particle(s) within a small localized region may be controlled. The direction of this speaker panel 300 may be controlled, e.g., by the controller 120 to direct the ultrasonic sound waves emitted by the panel 300 in a desired direction based on particle movement and a particle movement plan, such as that described above.

FIG. 3B illustrates a multi-particle speaker array 3000 with which the speaker array 130 may be implemented. Referring to FIG. 3B, the speaker array 3000 includes individual speaker panels dedicated to emitting ultrasonic sound waves to control the movement particles within different small localized regions of the region 140. The direction of each speaker panel 300 may be controlled by the controller 120 to direct the ultrasonic sound waves emitted by each speaker panel. Thus, the speaker array 3000 shown in FIG. 3B may produce ultrasonic sound waves in many different directions, causing the movement of many different particles. Additionally, the speaker array 3000 may be moved towards and away from the surface 150, thus adjusting the distance of particle movement. The speaker array 3000 shown in FIG. 3B is a 10×10 array including 100 speaker panels. However, it should be appreciated that a speaker array may include any number of speaker panels.

FIG. 3C illustrates a connection between the speaker panels and the controller 120. For ease of illustrations, six speaker panels 300a, 300b, 300c, 300d, 300e, and 300f are shown. However, it should be appreciated that a similar connection of speaker panels to the controller 120 may be used for any number of panels.

According to illustrative embodiments, each speaker panel may include discrete resonator elements, each of which is excited by a sinusoidal signal voltage having an ultrasonic frequency. The sinusoidal signal may be produced by logic in the speaker panel (not shown for ease of illustrations) in response to an analog control signal from the controller 120. As an alternative, the controller 120 may send a sinusoidal signal to each portion of each speaker panel to excite the resonator to cause output of an ultrasonic sound wave.

Figure 4:
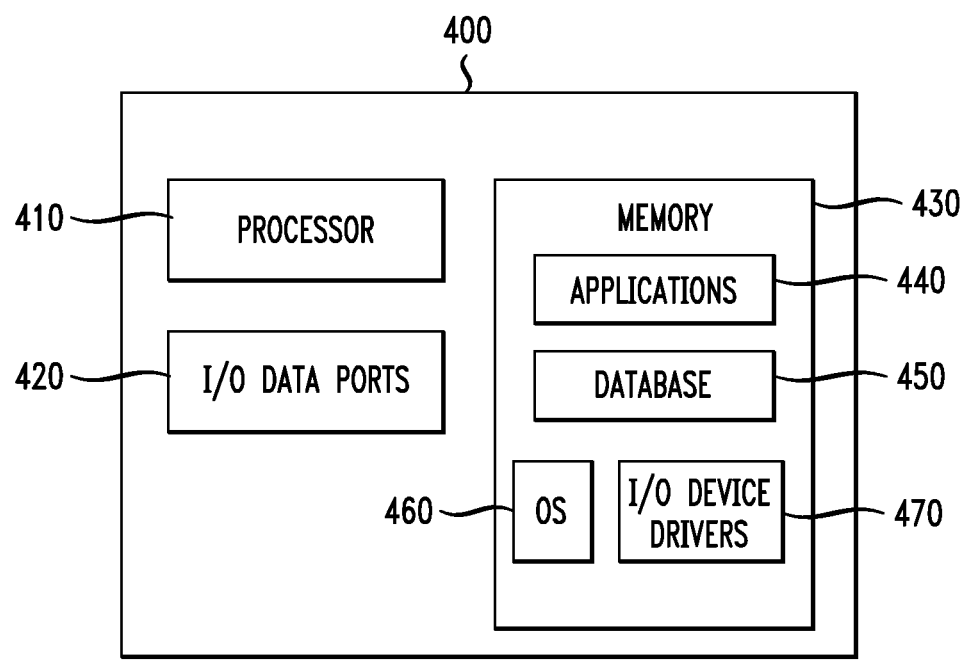
FIG. 4 illustrates a controller for controlling sound emission from speaker arrays according an illustrative embodiment.

FIG. 4 illustrates a block diagram of a computing device with which the controller 120 may be implemented, according to illustrative embodiments. Although no connections are shown between the components illustrated in FIG. 4, those skilled in the art will appreciate that the components can interact with each other via any suitable connections to carry out device functions.

It should be understood that FIG. 4 and the following description are intended to provide a brief, general description of a suitable environment in which the various aspect of some embodiments of the present disclosure can be implemented. While the description includes a general context of computer-executable instructions, the present disclosure can also be implemented in combination with other program modules and/or as a combination of hardware and software in addition to, or instead of, computer readable instructions.

The term "application", or variants thereof, is used expansively herein to include routines, program modules, program, components, data structures, algorithms, and the like. Applications can be implemented on various system configurations, including single-processor or multiprocessor systems, minicomputers, mainframe computers, personal computers, handheld-computing devices, microprocessor-based, programmable consumer electronics, combinations thereof, and the like. The terminology "computer-readable media" and variants thereof, as used in the specification and claims, includes non-transitory storage media, excluding propagating signals. Storage media can include volatile and/or non-volatile, removable and/or non-removable media, such as, for example, RAM, ROM, EEPROM, flash memory or other memory technology, CDROM, DVD, or other optical disk storage, magnetic tape, magnetic disk storage, or other magnetic storage devices or any other medium.

Referring to FIG. 4, the computing device 400 may be implemented in any suitable computing device and on any suitable network. According to an illustrative embodiment, the computing device 400 may be implemented on a local network, e.g., a LAN, connected to a public network, e.g., the Internet, etc.

Referring to FIG. 4, the computing device 400 includes a processor 410 that receives inputs and transmits outputs via I/O Data Ports 420. The I/O Data Ports 420 can be implemented with, e.g., an interface including an antenna or other suitable type of transceiver through which data and signals may be transmitted and received wired and/or wirelessly. For example, the I/O Data Ports may receive signals from a user 110 and transmit control signals to the speaker array 130. Also, the I/O Data Ports 420 may receive signals from the speaker array 130. Further the I/O Data Ports may receive and transmit signals from external controllers or sources, e.g., a network controller, an alarm, a radio, etc.

The computing device 400 also includes a physical hard drive 480. The processor 410 communicates with the memory 430 and the hard drive 480 via, e.g., an address/data bus (not shown). The processor 410 can be any commercially available or custom microprocessor. The memory is 430 is representative of the overall hierarchy of memory devices containing the software and data used to implement the functionality of the device 400. The memory 430 can include, but is not limited to the types of memory devices described above. As shown in FIG. 4, the memory 430 may include several categories of software and data used in the device 400, including applications 440, a database 450, an operating system (OS) 460, and input/output (I/O) device drivers 470.

The I/O device drivers 470 may include various routines accessed through at least one of the OS 460 by the applications 440 to communicate with devices and certain memory components.

The applications 440 can be stored in the memory 430 and/or in a firmware (not shown) as executable instructions, and can be executed by the processor 410. The applications 440 include various programs that implement the various features of the device 400. For example, the applications 440 include applications for calculating a particle movement plan, determining properties of a surface, instructing the speaker array 130 to emit sound waves, determining whether an appearance of a surface is a desired surface, etc.

The database 450 represents the static and dynamic data used by the applications 440, the OS 460, the I/O device drivers 470 and other software programs that may reside in the memory. The database may 450 may be used to store various data, e.g., data needed to execute the applications 440. For example, the database may include particle movement plans, sound patterns, data indicative of predetermined conditions based on which particle movement is initiated, etc.

While the memory 430 is illustrated as residing proximate the processor 410, it should be understood that at least a portion of the memory 430 can be a remotely accessed storage system, for example, a server on a communication network, a remote hard disk drive, a removable storage medium, combinations thereof, and the like. Thus, any of the data, applications, and/or software described above can be stored within the memory 430 and/or accessed via network connections to other data processing systems (not shown)

that may include a local area network (LAN), a metropolitan area network (MAN), or a wide area network (WAN), for example.

Figure 5:
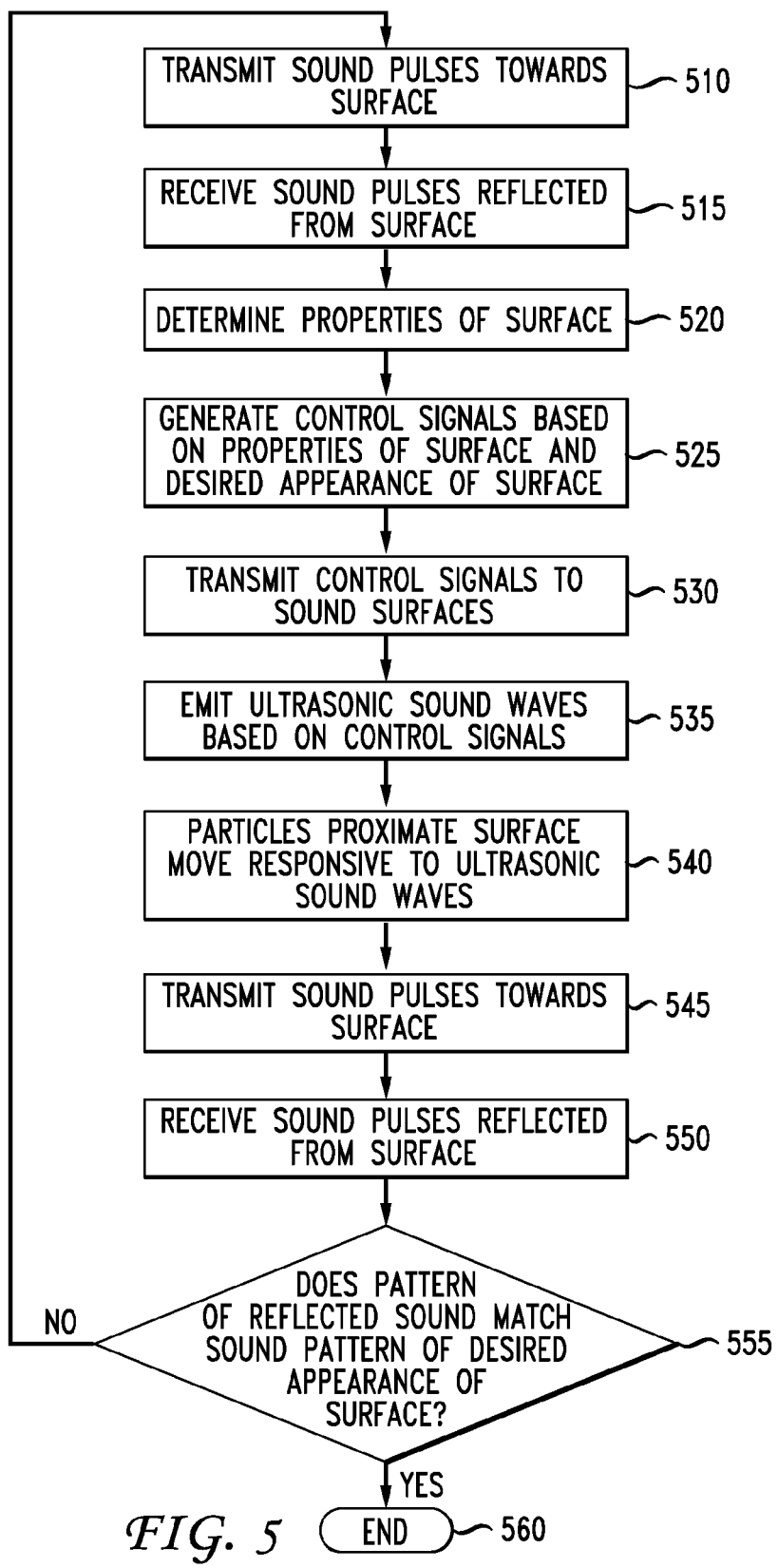
FIG. 5 illustrates a method for controlling the appearance of a surface using sound waves according to an illustrative embodiment.

FIGS. 5A and 5B illustrate a method for controlling an appearance of a surface according to illustrative embodiments. It should be understood that the steps or other interactions of the illustrated methods are not necessarily presented in any particular order and that performance of some or all the steps in an alternative order is possible and is contemplated. The steps have been presented in the demonstrated order for ease of description and illustration. Steps can be added, omitted and/or performed simultaneously without departing from the scope of the appended claims. It should also be understood that the method can be ended at any time. In certain embodiments, some or all steps of the method, and/or substantially equivalent steps can be performed by execution of computer-executable instructions stored or included on a non-transitory computer-readable medium.

Referring to FIG. 5A, the method begins at step 510 at which a pinging sound pulse is sent towards a surface, e.g., the surface 150, from a sound source, e.g., a speaker array 130. The pinging sound pulse may be sent responsive to instructions from the controller 120 based on input from a user 110. At step 515, sound pulses reflected from the surface 110 are received. At step 520, properties of the surface, such as the dimensions, the location, etc., are determined. This determination may be made by the sound array 130 or the controller 120.

At step 525, the controller 120 generates control signals based on the determined properties of the surface. The control signals are also generated based on a desired appearance of the surface and a particle movement plan calculated to achieve that appearance.

At step 530, the controller 120 transmits the control signals to the speaker array 130. At step 535, the speaker array 130 emits ultrasonic sound waves. The amplitude and/or phase of sound waves emitted by the panels of the speaker array 130 may be varied based on the control signals.

From step 535, the method proceeds to step 540 at which particles within a region 140 proximate the surface 150 move due to a pressure force produced by the ultrasonic sound waves.

At step 545, sound pulses are transmitted to the surface 150 from the speaker array 130. The sound pulses may be sent responsive to instructions from the controller 120.

At step 550, reflected sound pulses are received from the surface 150. At step 555, the controller 120 determines whether the pattern of the reelected sound pulses matches a sound pattern that corresponds to the desired appearance of the surface. If so, the process ends. Otherwise, the process returns to step 510, and the steps are repeated until the pattern of the reflected sound pulses matches the sound pattern corresponding to the desired appearance of the surface 150.

The law does not require and it is economically prohibitive to Illustrate and teach every possible embodiment of the present claims. Hence, the above-described embodiments are merely illustrative illustrations of implementations set forth for a clear understanding of the principles of the disclosure. Variations, modifications, and combinations may be made to the above-described embodiments without departing from the scope of the claims. All such variations, modifications, and combinations are included herein by the scope of this disclosure and the following claims.

What is claimed is:

1. A system, comprising:
a plurality of sound sources,
wherein the plurality of sound sources emit sound pulses towards a surface to obtain reflected sound pulses which are used to determine properties of the surface;
wherein the plurality of sound sources are operable to receive control signals from a controller, based on the properties of the surface that are determined, and to emit variable ultrasonic sound waves towards the surface based on the control signals, and
wherein the variable ultrasonic sound waves create a force which causes particles within a region proximate the surface to move in a desired manner with respect to the surface.

2. The system of claim 1,
wherein the particles are visible, and the control signals control emission of the variable ultrasonic sound waves to cause the particles that are visible within the region proximate the surface to move with respect to the surface such that the surface has a desired appearance.

3. The system of claim 1,
wherein the controller generates the control signals and determines the properties of the surface based on the reflected sound pulses.

4. The system of claim 1,
wherein the plurality of sound sources determine the properties of the surface based on the reflected sound pulses.

5. The system of claim 1,
wherein the control signals control emission of the variable ultrasonic sound waves by the plurality of sound sources based on the properties of the surface that are determined and based on a desired appearance of the surface.

6. The system of claim 1,
wherein the properties of the surface that are determined include a location of the surface.

7. The system of claim 1,
wherein the properties of the surface that are determined include dimensions of the surface.

8. A method, comprising:
emitting sound pulses from a plurality of sound sources towards a surface to obtain reflected sound pulses which are used to determine properties of the surface;
receiving, by the plurality of sound sources, control signals from a controller, wherein the control signals are based on the properties of the surface that are determined; and
emitting variable ultrasonic sound waves from the plurality of sound sources towards the surface based on the control signals, wherein the variable ultrasonic sound waves create a force which causes particles within a region proximate the surface to move in a desired manner with respect to the surface.

9. The method of claim 8,
wherein the particles are visible, and the control signals control emission of the variable ultrasonic sound waves to cause the particles that are visible within the region proximate the surface to move with respect to the surface such that the surface has a desired appearance.

10. The method of claim 8, further comprising:
receiving the reflected sound pulses from the surface.

11. The method of claim 8,
wherein the properties of the surface are determined by the controller.

12. The method of claim 8,
wherein the properties of the surface are determined by the plurality of sound sources.

13. The method of claim 8,
wherein the control signals control emission of the variable ultrasonic sound waves by the plurality of sound sources based on the properties of the surface that are determined and based on a desired appearance of the surface.

14. The method of claim 13, further comprising:
transmitting additional sound pulses to the surface after the particles are moved;
receiving additional reflected sound pulses from the surface based on the additional sound pulses that are transmitted; and
determining whether an appearance of the surface is the desired appearance based on the additional reflected sound pulses.

15. A computer readable storage device having computer-readable instructions stored thereon which, when executed by a processor cause the processor to perform operations comprising:
controlling emission of sound pulses towards a surface to obtain reflected sound pulses which are used to determine properties of the surface;
generating control signals, based on the properties of the surface that are determined, responsive to input indicating a desired appearance of the surface; and
transmitting the control signals to a plurality of sound sources to cause the plurality of sound sources to emit variable ultrasonic sound waves towards the surface and create a force which causes visible particles within a region proximate the surface to move with respect to the surface such that the surface has the desired appearance.

16. The computer readable storage device of claim 15,
wherein the operations further comprise:
transmitting signals to the plurality of sound sources to instruct the plurality of sound sources to transmit the sound pulses to the surface; and
determining the properties of the surface based on the reflected sound pulses received from the surface.

17. The computer readable storage device of claim 16,
wherein the control signals are generated based on the properties of the surface that are determined and the desired appearance of the surface.

18. The computer readable storage device of claim 15,
wherein the operations further comprise:
transmitting additional signals to the plurality of sound sources to instruct the plurality of sound sources to transmit sound pulses to the surface after the particles are moved; and
determining whether an appearance of the surface is the desired appearance based on additional reflected sound pulses received from the surface based on the sound pulses transmitted after the particles are moved.

19. The system of claim 1, further comprising:
the controller.

* * * * *